United States Patent [19]

Ahmed

[11] 3,737,682

[45] June 5, 1973

[54] TRIGGERED FLIP-FLOP

[75] Inventor: Adel Abdel Aziz Ahmed, Annandale, N.J.

[73] Assignee: RCA Corporation, New York, N.Y.

[22] Filed: Feb. 10, 1972

[21] Appl. No.: 225,045

[52] U.S. Cl. ................................307/291, 307/247 R
[51] Int. Cl. ..............................................H03k 3/286
[58] Field of Search ..................307/247 R, 288, 291, 307/292

[56] References Cited

UNITED STATES PATENTS

| | | | |
|---|---|---|---|
| 2,916,638 | 12/1959 | Clark | 307/291 |
| 2,885,574 | 5/1959 | Roesch, Jr. | 307/291 |
| 3,131,317 | 4/1964 | Yee | 307/247 R |
| 3,569,745 | 3/1971 | Kardash | 307/247 R |

*Primary Examiner*—John Zazworsky
*Attorney*—H. Christoffersen and G. Donald Weber Jr.

[57] ABSTRACT

A bistable multivibrator (flip-flop) including gating means for applying trigger signals to the flip-flop to effect the triggering thereof without the use of steering capacitors. The gating means includes complementary semiconductor devices which achieve a memory type function.

14 Claims, 1 Drawing Figure

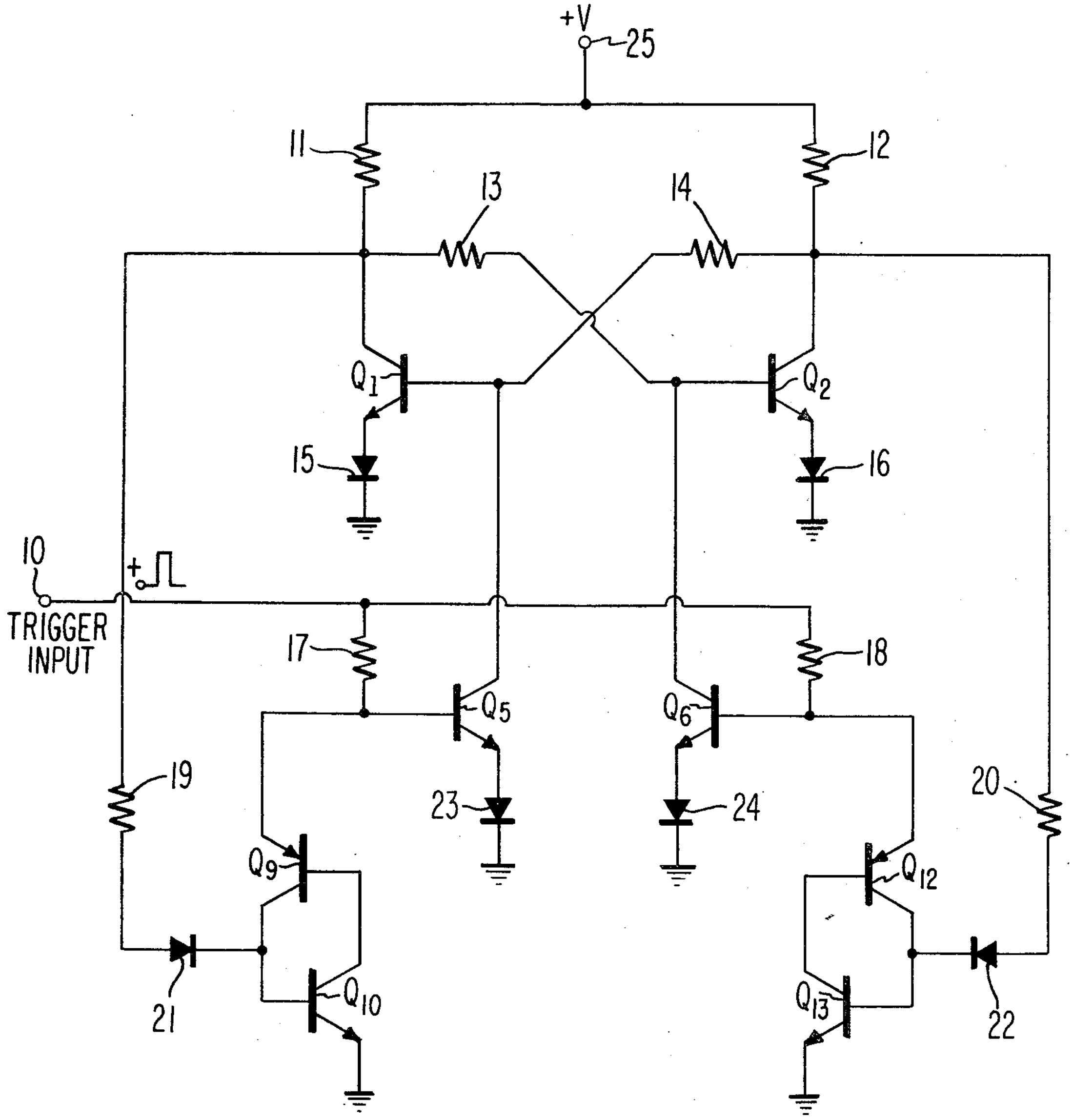
+V
25
11
12
13
14
Q1
Q2
15
16
10
TRIGGER INPUT
17
18
Q5
Q6
19
20
23
24
Q9
Q12
21
22
Q10
Q13

TRIGGERED FLIP-FLOP

BACKGROUND OF THE INVENTION

Bistable multivibrators or flip-flops are well-known in the art. In order to operate a flip-flop as a triggerable flip-flop, a trigger signal must be applied alternately to each side or section of the flip-flop to effect operation thereof. However, the trigger signal must be prevented from being applied to the other side of the flip-flop in order to prevent an indeterminate condition. In the past, capacitors have generally been used for the purpose of steering the trigger signal. However, in integrated circuit applications, capacitors are undesirable. That is, capacitors are relatively expensive to produce and utilize excess amounts of chip area. Also capacitors tend to be unreliable and subject to failure. Therefore, alternative circuit approaches not using capacitors are desirable.

SUMMARY OF THE INVENTION

A circuit which embodies the instant invention comprises a conventional flip-flop circuit (without cross-coupling capacitor circuits). The trigger signal steering circuit includes a pair of semiconductor networks including complementary semiconductor devices. The complementary semiconductor devices are connected to the flip-flop and placed in one operating status (e.g. enabled) as a function of the status of the conventional flip-flop circuit. Thus, the application of a trigger signal causes one portion of the trigger signal steering circuit to be rendered operative and to supply a signal to the flip-flop circuit, whereby the status of the flip-flop circuit is changed and a conditioning signal is supplied from the flip-flop to another portion of the trigger signal steering circuit to determine the operating status thereof.

BRIEF DESCRIPTION OF THE DRAWING

The single FIGURE is a schematic diagram of a preferred embodiment of the instant invention.

DESCRIPTION OF THE PREFERRED EMBODIMENT

As shown in the accompanying schematic diagram, a conventional flip-flop circuit (without capacitive cross-coupling networks) is formed utilizing transistors Q1 and Q2. The collectors of transistors Q1 and Q2 are connected to terminal 25 which is representative of a source +V via resistors 11 and 12, respectively. The emitter electrodes of transistors Q1 and Q2 are connected to ground via voltage level shifting diodes 15 and 16, respectively. In this embodiment, and with the NPN transistors shown, diodes 15 and 16 are arranged so that the cathodes thereof are connected to ground potential. In an alternative embodiment, the emitter electrodes of transistors Q1 and Q2 may be connected together and to ground through a single diode. The base of transistor Q1 is connected to the collector of transistor Q2 via resistor 14. Similarly, the base of transistor Q2 is connected to the collector of transistor Q1 via resistor 13.

In addition, the collector of transistor Q1 is connected via the series combination of resistor 19 and diode 21 to the common junction of the collector electrode of PNP transistor Q9 and the base electrode of NPN transistor Q10. The emitter electrode of transistor Q10 is connected to ground while the collector electrode thereof is connected to the base of transistor Q9. The emitter of transistor Q9 is connected to the base of transistor Q5 which has the collector electrode thereof connected to the base of transistor Q1. The emitter of transistor Q5 is connected to the anode of voltage level shifting diode 23 which has the cathode thereof connected to ground. In addition, the base of transistor Q5 is connected via resistor 17 to trigger input terminal 10.

Trigger input terminal 10 is also connected via resistor 18 to the base of transistor Q6. The emitter of transistor Q6 is connected to the anode of voltage level shifting diode 24 which has the cathode thereof connected to ground. The collector of transistor Q6 is returned to the base of transistor Q2.

The common junction of resistor 18 and base electrode of transistor Q6 is connected to the emitter electrode of PNP transistor Q12. The base of transistor Q12 is connected to the collector electrode of NPN transistor Q13 which has the emitter thereof connected to ground. The base of transistor Q13 and the collector of transistor Q11 are connected together. This common junction is connected to the cathode of diode 22 which has the anode thereof connected to the collector of transistor Q2 via resistor 20.

In essence, transistors Q1 and Q2 form a flip-flop network, while transistor pair Q9 and Q10 and transistor pair Q12 and Q13 (each of which pairs is a pair of complementary conductivity type semiconductors) operate as "SCR" circuits. Transistors Q5 and Q6 provide coupling between the "SCR" circuits and the flip-flop, whereby control of the flip-flop is effected.

In considering the operation of the circuit, it is initially assumed that the flip-flop is in the one of the two stable conditions in which transistor Q1 is conductive and transistor Q2 is nonconductive. In the absence of the application of a trigger signal at input terminal 10, this condition is maintained. As suggested by the waveform adjacent terminal 10, the absence of a trigger signal causes input terminal 10 to be at approximately ground potential. Inasmuch as transistor Q1 is conductive, the collector electrode thereof is in the low level condition, i.e., at approximately one forward-biased junction drop above ground potential (ignoring the voltage drop across transistor Q1). This voltage level is established by the voltage (junction) drop across diode 15. This low voltage signal is applied to the base of transistor Q10 via the coupling network including resistor 19 and diode 21. As a result of the low voltage signal applied to the base thereof, transistor Q10 is effectively nonconductive. Therefore, the "SCR" network comprising transistors Q10 and Q9 is nonconductive.

Conversely, inasmuch as transistor Q2 is considered to be nonconductive, the voltage at the collector thereof is greater than two forward-biased junction drops, e.g. about +1.4 volts, as established by the voltage drop across diode 15 and the $V_{BE}$ drop across transistor Q1. This positive signal is supplied by the coupling network including resistor 20 and diode 22 to the base electrode of transistor Q13. The application of the relatively positive signal to the base thereof causes the base-emitter junction of transistor Q13 to be conductive. Thus, transistor Q13 and the associated "SCR" network (including transistors Q12 and Q13) is enabled or primed for further operation.

With the application of a positive-going trigger signal at input terminal 10, a relatively positive voltage signal is applied to the base electrodes of transistors Q5 and Q6 as well as to the emitter electrodes of transistors Q9 and Q12. The relatively positive signal at the emitter electrode of transistor Q12 essentially forward biases transistor Q12 and renders the transistor conductive. That is, transistor Q13 has previously been primed by the relatively positive signal at the collector of transistor Q2. When transistor Q13 is primed or enabled, the collector thereof, which is connected to the base of transistor Q12, is at a potential near ground. Consequently, the trigger signal, which is more positive than the signal supplied to the base of transistor Q13 and the collector of transistor Q12, causes transistor Q12 to be conductive. Thus, the SCR circuit comprising transistors Q12 and Q13 effectively clamps the base electrode of transistor Q6 at a potential such that transistor Q6 will not be turned on. That is, the circuit comprising transistors Q12 and Q13 exhibits lower impedance to the trigger signal than the impedance of the base-emitter junction of transistor Q6 and the impedance of diode 24. Thus, transistor Q6 is not rendered conductive and there is no trigger pulse applied at the base of transistor Q2.

Furthermore, even if transistor Q6 is turned on or rendered conductive momentarily by the positive trigger signal, the potential at the base of transistor Q2 is relatively low as noted supra. This potential is not significantly different from the potential at the emitter of transistor Q6 whereby it would be impossible to provide a significant signal at the base of transistor Q2. Conversely, the application of the relatively positive trigger signal to the emitter of transistor Q9 is ineffectual with respect to Q9 and Q10 inasmuch as transistor Q10 is reverse biased and turned off. However, the application of the positive going trigger signal to the base of transistor Q5 renders this transistor conductive. When transistor Q5 is rendered conductive, the base electrode of transistor Q1 is essentially clamped to a relatively low voltage (i.e., nearly one forward-biased junction drop above ground potential). Thus, transistor Q1 is rendered nonconductive and the potential at the collector thereof switches to the high level (i.e., toward +V potential). This positive signal at the collector of transistor Q1 is applied to the base of transistor Q10 via a coupling network comprising resistor 19 and diode 21 and causes transistor Q10 to be enabled or primed. Assuming the trigger signal is still applied, transistor Q9 is also rendered conductive wherein the SCR network comprising transistors Q9 and Q10 is operative to clamp the base of transistor Q5 to one forward-biased junction drop above ground potential whereby transistor Q5 is rendered non-conductive. Thus, the base of transistor Q1 is no longer clamped to near ground potential by Q5.

When transistor Q5 conducted and clamped the base of transistor Q1 to the low voltage level, the potential at the collector of transistor Q1 rapidly rose to a high level and was applied, in addition to the base of transistor Q10, to the base of transistor Q2. Thus, transistor Q2 was rendered conductive inasmuch as transistor Q6 was non-conductive. With transistor Q2 rendered conductive, the potential at the collector switches to the relatively low voltage level, which level is applied to the base of transistor Q1, in addition to being applied to the anode of diode 22. Consequently, transistor Q1 is essentially maintained in the nonconductive condition due to the conduction of transistors Q5 or Q2. The low voltage (or relatively negative) signal at the collector of transistor Q2 is not transmitted to the base of transistor Q13 inasmuch as diode 22 is reverse biased by the signals applied thereto and transistor Q13 is, therefore, nonconductive.

So long as the trigger signal remains at the positive voltage level, no additional trigger effects on the circuit are possible. That is, transistors Q5 and Q6 are each clamped in the nonconductive condition by the respective SCR circuits associated therewith. Thus, transistors Q5 and Q6 do not exert any circuit influence on flip-flop transistors Q1 and/or Q2. In addition, the SCR network comprising transistors Q9 and Q10 is maintained in the on condition by the inherent connection thereof and the application of the positive voltage trigger signal to the emitter of transistor Q9 and the relatively positive signal supplied to the base of transistor Q10 from the collectors of Q1 and Q9. Similarly, the SCR network comprising transistors Q12 and Q13 is maintained in the conductive condition through the interconnections thereof and the application of the positive trigger input signal. Moreover, inasmuch as diode 22 is reverse biased, the relatively negative signal at the collector of transistor Q2 is not communicated to the SCR network.

However, when the trigger voltage returns to zero or ground potential, both of the SCR networks are rendered nonconductive inasmuch as the positive signal is removed from the emitter electrodes of transistor Q9 and transistor Q12, respectively. However, the relatively positive signal at the collector of transistor Q1 is transmitted to the base of transistor Q10 via the coupling network associated therebetween and causes transistor Q10 to remain in the primed or enabled condition. Thus, it is seen that the SCR network comprising transistors Q9 and Q10 is ready for immediate operation upon the application of the subsequent trigger signal and will clamp the base of transistor Q5 upon the application of the subsequent trigger signal. Conversely, the SCR network comprising transistors Q12 and Q13 is not primed and will not inhibit or prevent the conduction of transistor Q6 with the application of the subsequent trigger signal. As a result, the subsequent trigger signal will cause transistor Q6 to be conductive to clamp the base electrode of transistor Q2 to near ground potential thereby rendering transistor Q2 nonconductive and essentially causing transistor Q1 to become conductive.

Thus, there has been described a preferred embodiment of a bistable multivibrator or flip-flop circuit which is selectively triggered by a trigger signal and which includes a steering circuit for the trigger signal to control the operation of the flip-flop circuit. This flip-flop circuit does not utilize any capacitor coupling devices or the like. Those skilled in the art will observe that certain modifications can be made to the circuit such as reversing polarities of sources or signals and reversing polarities of the semiconductor devices as well. Moreover, semiconductor devices of different types, for example, integrated circuit semiconductor devices and the like, may be utilized in the circuit and the semiconductor devices shown and suggested are intended to be illustrative only and not to be limitative of the invention.

What is claimed is:

1. A multivibrator circuit including
a flip-flop circuit, input means for receiving a trigger signal, control means connected to said flip-flop circuit and to said input means, said control means including at least one pair of complementary conductivity type semiconductor devices, said control means adapted to assume different operating conditions in accordance with the status of said flip-flop circuit, and said control means adapted to supply a signal to said flip-flop circuit in response to the application of a trigger signal to said input means such that the status of said flip-flop circuit changes.

2. The multivibrator circuit recited in claim 1 wherein said flip-flop circuit includes a pair of semiconductor devices which are cross-coupled by nonreactive means.

3. The multivibrator circuit recited in claim 1 wherein said control means includes coupling means connected between said pair of complementary conductivity type semiconductor devices and said flip-flop circuit.

4. The multivibrator circuit recited in claim 1 wherein said control means includes two pairs of complementary conductivity semiconductor devices, each of said pairs of semiconductor devices being in a different operating state in accordance with the status of said flip-flop circuit.

5. In combination, first and second transistors cross-coupled to provide a flip-flop circuit, trigger signal supplying means, first and second control circuit means, each including a pair of complementary conductivity type semiconductor devices connected in a trigger circuit configuration, said first and second control circuit means connected to receive a signal from said first and second transistors, respectively, such that one of said first and second control circuit means is enabled as a function of the operating states of said first and second transistors of said flip-flop circuit, first clamping means connected between said first control circuit means and said first transistor, second clamping means connected between said second control circuit means and said second transistor, said trigger signal supplying means connected to said first and second clamping means and to said first and second control circuit means in order to supply trigger signals thereto such that said one of said first and second control circuit means which was previously enabled is rendered operative and the associated clamping is rendered inoperative while the other of said first and second control circuit means remains inoperative and the associated clamping means is rendered operative and thereby to supply a signal to said flip-flop circuit to change the states of said first and second transistors.

6. The combination recited in claim 5 wherein each of said first and second clamping means includes transistor means.

7. The combination recited in claim 5 wherein said first and second transistors are cross-coupled by nonreactive impedance means.

8. The combination recited in claim 5 wherein said first and second transistors each have base, emitter and collector electrodes, said first clamping means includes a third transistor having base, emitter and collector electrodes, said second clamping means includes a fourth transistor having base, emitter and collector electrodes, the emitter electrodes of said third and fourth transistors, being connected to a reference potential source, the collector electrodes of said third and fourth transistors being connected to base electrodes of said first and second transistors respectively, the base electrodes of said third and fourth transistors being connected to said trigger signal supplying means, each said pair of complementary conductivity type semiconductor devices of said first and second control circuit means comprising a pair of transistors having base, emitter and collector electrodes, the emitter electrode of one of the transistors in each pair of transistors being connected to said reference potential source, the emitter electrode of the other of the transistors in each pair of transistors being connected to the base electrode of said third and fourth transistors respectively, the base electrode of said one transistor being connected to the collector electrode of said other transistor and to the collector electrode of the associated one of said first and second transistors respectively, and the base electrode of said other transistor being connected to the collector electrode of said one transistor.

9. In combination:

a flip-flop which includes two transistors, each having an input, output and control electrode, the control electrode of each transistor connected to the output electrode of the other transistor;

two switch means, one connected between one electrode of one transistor and a point of reference potential and the other connected between the corresponding electrode of the other transistor and said point of reference potential; and means for alternately momentarily closing said switch means one at a time, comprising a first pair of transistors of complementary conductivity types coupled between one transistor of said flip-flop and one of the switch means for controlling said one switch means and a second pair of transistors of complementary conductivity types coupled between the other transistor of said flip-flop and the other of said switch means for controlling the other of said switch means, and means for concurrently applying trigger signals to said two switch means and to the first and second pairs of transistors of complementary conductivity types.

10. The combination recited in claim 9 where each said pair of transistors of complementary conductivity type comprises transistors having base, emitter and collector electrodes with the base electrode of each transistor connected to the collector electrode of the other transistor.

11. In a circuit as set forth in claim 10, one transistor of said flip-flop supplying a signal of one sense to one base-collector connection of one pair of said complementary transistors for causing base-emitter current to flow through one transistor of said pair whereby the base of the other transistor of said pair is placed at a level to prime said other transistor, and the other transistor of said flip-flop supplying a signal of opposite sense to the corresponding base-collector connection of the other pair for disabling both transistors of said other pair.

12. The combination recited in claim 9 wherein said first pair of transistors of complementary symmetry type is coupled between the output electrode of one of said flip-flop transistors and the switch means which is coupled to the same transistor, and said second pair of transistors of complementary symmetry type is coupled between the output electrode of the other transistor of said flip-flop and the switch means which is coupled to said other transistor of said flip-flop.

13. The combination recited in claim 9 wherein each said switch means comprises a transistor having a control electrode adapted to receive a trigger signal and having a conduction path connected between the control electrode of a separate one of the flip-flop transistors and said point of reference potential.

14. The combination recited in claim 13 wherein said means for concurrently applying trigger signals comprises a trigger input terminal coupled to the control electrodes of the transistors comprising said two switch means and to one transistor of each of said pair of transistors of complementary conductivity types.

* * * * *